United States Patent

[11] 3,600,685

[72] Inventor William C. Doyle
Los Altos, Calif.

[21] Appl. No. 809,053
[22] Filed Mar. 20, 1969
Continuation of Ser. No. 602,454, Dec. 13, 1966, Pat. No. 3,600,685.
[45] Patented Aug. 17, 1971
[73] Assignee Itek Corporation
Lexington, Mass.

[54] APPARATUS AND METHOD FOR INTERFERING WITH RADIO COMMUNICATIONS
9 Claims, 5 Drawing Figs.

[52] U.S. Cl. .......... 325/332, 343/18
[51] Int. Cl. .......... H04b 1/36
[50] Field of Search .......... 325/6, 20, 332; 343/18 E

[56] References Cited

UNITED STATES PATENTS

| | | | |
|---|---|---|---|
| 2,943,318 | 6/1960 | Deloraine et al. | 343/18 E |
| 2,978,699 | 4/1961 | Dodington | 343/18 E |
| 3,015,096 | 12/1961 | Deloraine et al. | 325/6 |
| 3,024,458 | 3/1962 | Cohen et al. | 343/100.7 |
| 3,019,433 | 1/1962 | White | 325/6 |

*Primary Examiner*—Rodney D. Bennett
*Assistant Examiner*—J. M. Potenza
*Attorney*—Harvey G. Lowhurst

ABSTRACT: Interfering with the radio communication between a transmitter and one or more receivers using the communication itself to destroy the intelligibility of the communication to the intended recipient. The communication is intercepted during one portion of a duty cycle and delayed by various different amounts. Thereafter, the differently delayed communications are added to form an unintelligible signal which is transmitted during the other portion of the duty cycle for reception by the intended recipient.

PATENTED AUG 17 1971 3,600,685

SHEET 1 OF 2

INVENTOR.
WILLIAM C. DOYLE
BY Harvey J. Lacohurst
ATTORNEY

INVENTOR
WILLIAM C. DOYLE
BY Harvey J. [signature]
ATTORNEY

APPARATUS AND METHOD FOR INTERFERING WITH RADIO COMMUNICATIONS

This is a continuation of application No. 602,454, filed Dec. 13, 1966.

This invention relates to the destruction of a radio communication link and more particularly to an apparatus and a method for interfering with the radio communications from a transmitter station for the purpose of making the transmitted intelligence unintelligible to an intended recipient.

Interfering with radio communication links of others is extensively used in modern warfare to deprive an intended recipient of vital information. Heretofore, the most often used communication interference systems were either of the deceptive communication type which utilized the transmission of false information, or of the jamming communication type which utilized the generation of signals, which, when combined with the transmitted signal, would make the received intelligence difficult or impossible to decipher. Both of the above described types of interference systems can be classed as "active" systems in that they involve the use of a transmitted interference signal which is independent of the intelligence which it is intended to make unintelligible.

The use of the deception technique, to be successful, requires extensive preparation and a thorough knowledge of the situation not generally available, and the use of the jamming technique requires strong signals not often available when needed. Further, both of the above described techniques make the transmitted intelligence also unintelligible to the interfering party and reveal to the party being interfered with the fact of the interfering party's knowledge of the existence of the communication link, the transmitting schedules, frequencies, rates and related operation. This knowledge will cause the establishment of new links, new frequencies, new schedules, new rates of transmission and the like, making the interference system uneffective until change or cope with the newly established links.

It is therefore a primary object of the present invention to provide an apparatus and a method of interfering with the radio communication links of others which does not deprive the interfering party of the collection of the transmitted intelligence and which makes the transmitted intelligence available for subsequent analysis.

It is a further object of this invention to provide an apparatus and a method for interfering with the radio communication links of others which is difficult to recognize and almost impossible to counteract.

It is another object of the invention to provide an apparatus and a method for interfering with the radio communication links of others which requires no information of the communication link other than the RF frequency and which is self-activating.

It is a still further object of the present invention to provide an apparatus and a method for interfering with the radio communication link of others which requires the radiation of less energy than that necessary for deception or jamming techniques and which interferes only when the communication link is actually in use.

A particular tactical situation to which the present invention is ideally suitable is the interference with the radio communication of ground controlled interceptors or of coordinated support aircraft attacks. In this kind of tactical situation, confusion of the enemy during the last crucial moments of interception is of primary importance because of the very high closing rate of modern aircraft. In other words, depriving a ground controlled interceptor of control information during the last crucial moments of an interception, a landing, or of avoiding an interception, may respectively kill the interceptor's mission, cause destruction of the controlled aircraft or place it into the pursuit path of the interfering party's aircraft.

It is therefore a further object of the present invention to provide an apparatus and method for interfering with the radio communication link of controlled interceptors to introduce confusion and time lags during the last crucial moment of a mission, a landing or the like.

It is a still further object of the invention to provide an apparatus and a method for interfering with the radio communication link of controlled or coordinated interceptors to buy the interfering party some valuable time when it is needed most.

It is a still further object of the invention to provide an apparatus and method for interfering with the radio communication link controlling or coordinating aircraft, which is not vulnerable to direction finding, either by ground based or airborne equipment, when actively radiating energy.

It is still another object of the invention to provide an apparatus and a method for interfering with the radio communication link of others which gives approximately a 6 db. advantage over noise jamming techniques.

Briefly, the present invention accomplishes the above stated objects by receiving the radio signal and detecting the intelligence of the communication link to be interferred with during one portion of a timed duty cycle (receiving portion), delaying the detected intelligence in time by various amounts to form various delayed intelligence signals, summing the various delayed intelligence signals to form a scrambled audio signal, and transmitting the scrambled signal on the same carrier frequency as the received signal during the other portion (transmitting portion) of the timed duty cycle. As a result of transmitting the scrambled audio signal on the same carrier frequency as the received signal, the intended recipient of the communication will not only receive the intended communication, but, during the transmitting portion of the duty cycle, will also receive the transmitted scrambled audio signal which, when added to the intended communication, will make the communication entirely unintelligible. Further, by alternately receiving and transmitting, as provided by the timed duty cycle, the received information will be free of the interfering signal during the receiving portion of the duty cycle and may be stored for subsequency analysis. By utilizing a sufficiently high duty cycle frequency, such as for example 10 kHz., the recorded intelligence will be perfectly intelligible upon playback and provide "read-through," and the intended recipient will find the entire transmission unintelligible.

Other objects and a better understanding of the invention may be determined by reference to the following description, taken in conjunction with the accompanying drawing, in which.

Figure 1:
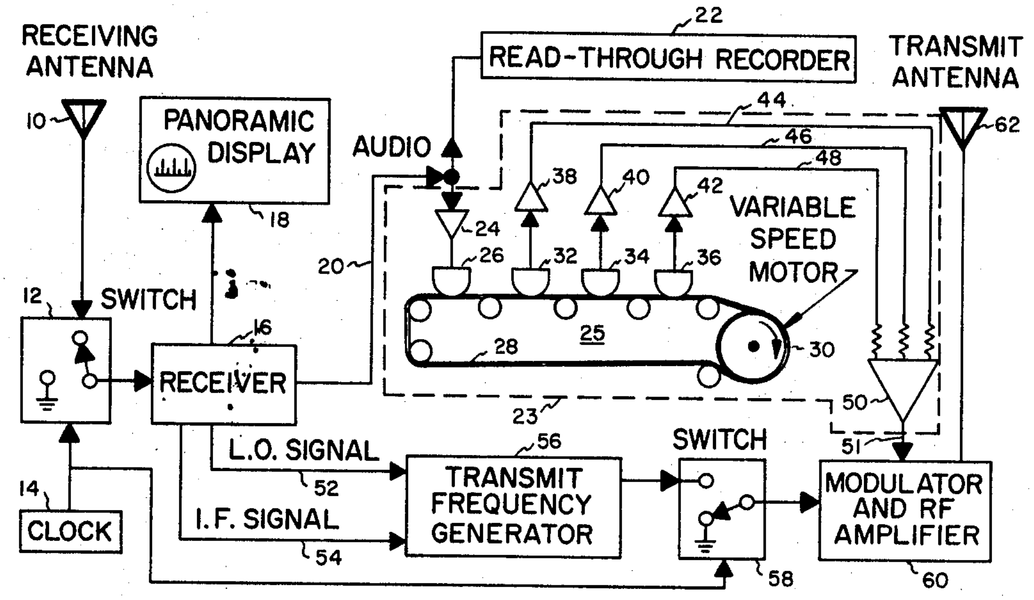
FIG. 1 is a schematic block diagram of a single channel radio communication interference system constructed in accordance with the present invention.

Referring now to the drawing, and more particularly to FIG. 1 thereof, there is shown a single channel radio communication interference system constructed in accordance with the present invention. The system has an antenna 10 which is dimensioned and constructed to receive the signal of the radio communication to be interfered with, which is usually, though not necessarily, in the VHF or UHF frequency region. Antenna 10 is connected to one terminal of a receive switch 12 which is normally closed and which is opened by a switch actuation means such as, for example, a clock 14. As will be explained hereinafter, since it is desired to employ switching rates of the order of magnitude of approximately 10 kHz., switch 12 is generally a solid-state switch such as are in wide use today, and clock 14 may take the form of a free running multivibrator.

The other terminal of switch 12 is connected to the input terminal of a tunable RF receiver 16 which is capable of demodulating and detecting the received intelligence and which provides the detected intelligence, usually in a form of an audio signal, on its output lead 20. For the purpose of tuning receiver 16 to the frequency of the incoming radio signal, it is connected to a panoramic frequency and amplitude display 18 also known as a frequency analyzer, which provides the information for tuning receiver 16 to the incoming signal. For well known reasons, the particular signal applied to panoramic display 18 is usually the IF frequency signal from receiver 16 and tuning is conventionally accomplished by changing the local oscillator frequency.

Receiver output lead 20 is connected to a read-through recorder 22 which may be a standard audio tape recorder, and also to an audio signal scramble unit 23 which includes endless loop of magnetic tape 28 movable over a fixed track by a variable speed drive motor means 30. Spaced along the fixed track is a magnetic recording head 26 which is followed by a plurality of magnetic reproducing heads such as 32, 34 and 36. Motor means 30 is arranged to move magnetic tape 28 from recording head 26 to reproducing heads 32, 34, and 36 so that any signal recorded upon tape 28 is reproduced by each of the reproducing heads at different times, the times corresponding to the time it takes the tape to move from recording head 26 to the various reproduce heads. Variable speed motor means 30 may be of any convenient configuration which allows the speed of the moving tape to be changed, either at random on in some preprogrammed fashion, so as to vary the time when the recorded audio signal is "read" by the various reproduce magnetic heads.

Receiver output lead 20 is connected to magnetic recording head 26 through a suitable input amplifier 24. Reproducing heads 32, 34 and 36 are connected, via suitable output amplifiers 38, 40, and 42, respectively, to a conventional signal summing network and amplifier combination 50, also referred to as a signal summing means. Signal summing means output 51 forms the output lead of audio signal scramble unit 23 which applies the scrambled audio signal to an RF modulator 60.

Figure 4:
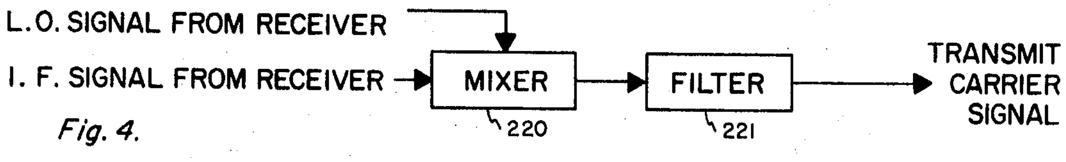
FIG. 4 is a schematic block diagram of the transmit frequency generator of FIGS. 1 and 2.

There is also provided a transmit frequency generator 56 which provides a carrier signal of the same frequency as the carrier signal of the signal received by antenna 10. While generator 56 may take any conventional form, one form is illustrated in FIG. 4 and comprises a mixer 220 having applied to it the L.O. signal from receiver 16 on leads 52 and the IF signal from receiver 16 on leads 54. A filter 221 for passing only the sum frequency signal of the L.O. signal and IF signal is placed in the output circuit of mixer 220. In this manner the carrier frequency is reconstructed and a transmit carrier signal is provided which is identical in frequency to the received carrier signal.

The output lead of transmit frequency generator 56 is connected to one side of a switch 58 which is normally open and which is closed by switch actuation means 14. In this manner, switch actuation means 14 closes switch 12 when it opens switch 58 and vice versa. The other side of switch 58 is connected to a RF amplifier and modulator circuit 60 which utilizes the scrambled audio signal to modulate the transmit carrier signal to provide a transmission signal. RF amplifier and modulator 60 has its output lead connected to a transmit antenna 62 for radiating the transmission signal for interference purposes.

The operation of the apparatus of FIG. 1 will now be explained in connection with an example. Assume that a ground station controls an interceptor which is on a final intercept course and that the apparatus shown in FIG. 1 is at a position which is within reception distance of the ground station and within transmitting distance of the interceptor. Further, assume that the control communication from the ground station is audio modulated upon a carrier having a frequency of 100 MHz and that receiver 16 has an IF frequency of 21.4 MHz. As soon as any communication is received by receiving antenna 10, receiver 16 is tuned, either automatically or by hand with the assistance of panoramic display 18, until the local oscillator signal is 78.6 MHz. Clock 14 is continuously running at a frequency of 10 kHz. or any other frequency which is sufficiently high so that the useful capability of read-through recorder 22 is maintained.

The audio signal (command signals directed to the interceptor) from receiver 16 is directly recorded on recorder 22 and also on moving tape 28 as long as receive switch 12 is closed. If a 50 percent duty cycle of clock 14 is assumed, the track of the audio signal recorded on recorder 22 and on tape 28 is in the form of bands which alternate with spaces, each band and space having a width of 50 microseconds. For read-through on recorder 22, this provides a sufficiently complete record of the communication for later evaluation. For developing the scrambled signal, the audio signal bands recorded on tape 28 by head 26 are delayed by many milliseconds before they are reproduced, first by head 32, then by head 34 and finally by head 36. When these three delayed signals are combined by summing network 50 to form the scrambled signal, the scrambled signal is unintelligible since it contains portions from three different audio signal bands of prior portions of the recorded audio signal.

Transit frequency generator 56, having applied thereto the L.O. signal of 78.6 MHz. and the IF signal of 21.4 MHz., reconstructs a carrier signal of 100 MHz. The reconstructed carrier is applied to modulator means 60 during the time switch 58 is closed and is modulated by the scrambled audio signal for summing network 50 and is then transmitted by antenna 62. The interceptor will now not only receive the intended transmission from the ground station, but also the scrambled audio signal from antenna 62 whenever switch 58 is closed. As a consequence of the simultaneous reception of both of these transmitted signals, the audio signal detected by the receiver of the interceptor will be unintelligible, and the communication has been successfully interfered with.

While it is believed that the delay between the various audio signals, forming the scrambled audio signal, is difficult if not impossible to detect by computer analysis, a further degree of security is provided by varying the speed with which tape 28 is moved. This is the reason for providing a variable speed motor means 30 which may be externally or internally programmed to provide variable tape speeds to change the delay of the signals making up the scrambled audio signal in some manner.

Figure 2:
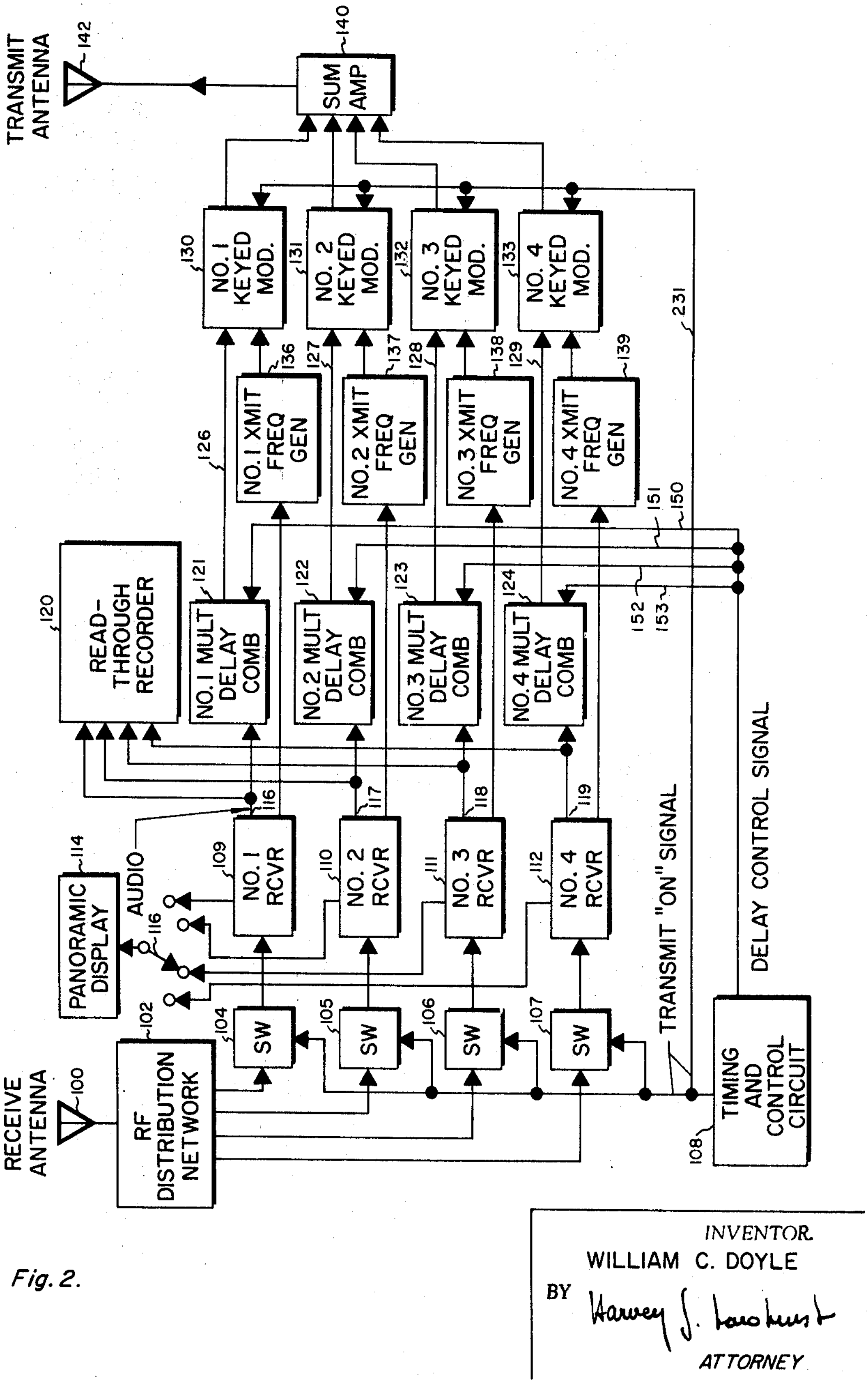
FIG. 2 is a schematic block diagram of a four channel radio communication interference system constructed in accordance with the present invention.

Referring now to FIG. 2, there is shown a four channel radio communication interference system constructed in accordance with the present invention which allows the simultaneous interference with four different communication links. It comprises a common receiving antenna 100 which is connected, via a suitable RF distribution network 102, to one side of four, normally closed, individual channel receive switches 104, 105, 106, and 107. Channel switches 104 to 107 are preferably of the solid-state type, such gates, and are controlled by a common timing and control circuit 108 which supplies a suitable gating signal to open them upon the occurrence of a transmit "on" signal.

The other side of switches 104 to 107 a re respectively connected to four individual channel receivers 109, 110, 111, and 112, which may be similar in all respects to receiver 16 of FIG. 1. For tuning purposes, a common panoramic display 114 is provided and connected, through a four position selector switch 116, to the intermediate frequency signal of the individual channel receivers. Each channel receiver has an audio signal output terminal, as shown at 116, 117, 118, and 119, which is connected to the four input terminals of a four track read-through magnetic tape recorder 120 for read-through, and also to individual channel multiple delay combiners 121, 122, 123, and 124, respectively, for developing the individual scrambled audio signals. The developed scrambled audio signals are applied, respectively, through leads 126, 127, 128 and 129, to individual channel keyed modulators 130, 131, 132, and 133 which modulate the reconstructed carrier signals with the scrambled audio signals when timing and control circuit 108 develops the transmit "on" signal.

Channel receivers 109, 110,111, and 112 are also connected to the individual channel transmit frequency generators 136, 137, 138, and 139, respectively, which generate or reconstruct transmit frequency carrier signals which have frequencies identical to those of the received carrier signals. The output terminals of channel transmit frequency generators 136, 137, 138, and 139 are, respectively, connected to channel keyed modulators 130, 131, 132, and 133 which include normally open switches which are closed by the transmit "on" signal from timing and control circuit 108. The output terminals of keyed modulators 130, 131, 132, and 133 are connected to a common summing amplifier 140 which is coupled to a common transmit antenna 142.

Timing and control circuit 108 is constructed to also provide either a common or four individual channel delay control signals which are connected to multiply delay combiners 121, 122, 123, and 124, via leads 150, 151, 152, and 153 respectively, to control the individual delays of the various audio signals which are combined to form the scrambled audio signals in accordance with a common or individual channel program. While each channel delay combiner, such as 121, may be constructed similar to the audio signal scrambled unit 23 of FIG. 1, in which case the control signal on lead 150 may be the speed control for motor 30, and alternate embodiment thereof is shown in FIG. 3.

Figure 3:
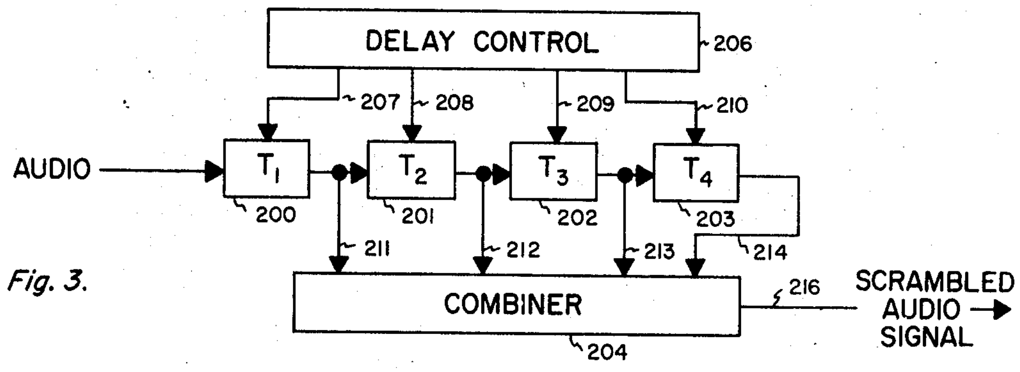
FIG. 3 is a schematic block diagram of the multiple delay combiner of FIG. 2.

Referring now to FIG. 3 there is shown an audio signal scramble unit in which the audio signal from the channel receiver audio output terminal (such as 116) is applied in series to a plurality of delay units 200, 201, 202, and 203. These delay units respectively provide time delay of $T_1$, $T_2$, $T_3$, and $T_4$ each, so that the audio signal on lead 211 is delayed on time $T_1$, the audio signal on lead 212 is delayed $T_1+T_2$, the audio signal on lead 213 is delayed $T_1+T_2+T_3$ and the audio signal on lead 214 is delayed $T_1+T_2+T_3+T_4$. The delayed audio signal from leads 211, 212, 213, and 214 are applied to a combiner 204 which may take the form of a conventional summing network, and which provides the scrambled audio signal on its output lead 126. The amount of the delay provided by each of delay circuits 200 to 203 may be varied by a delay control means 206, which generally forms a part of timing and control circuit 108 of FIG. 2. Delay control means 206 provides a delay control signal on its four output leads 207, 208, 209, and 210 which are respectively applied to delay units 200, 201, 202, and 203.

A suitable circuit for delay unit such as 200 may take anyone of a number of different forms. For example, the delay units may be individual tape recorders having a recording head and a reproduce head which are spaced apart and form the input and output terminals of each delay unit. In this case the control signals from control 206 operate the magnetic tape drive unit. Another form of delay unit may be formed by a device such as is shown in FIG. 1 but where each magnetic reproduce head is individually movable along the fixed track and where the control signal from control 206 (leads 207—210) control the reproduce head motion. Still another form of individual delay unit is an ultrasonic delay (magnetostriction) line stack, having FM signal modulator means is its input circuit and a FM detector means in its output circuit. In this case, the control signal on lines 207—210 may be utilized to change the active length of the stack in a digital manner.

The channel frequency generator, such as 136, may take the form shown in FIG. 4 which comprises a mixer 220 having applied thereto the L.O. signal and the IF signal from its associated channel receiver and a suitable band pass filter 221 whose band pass is selected to pass only the sum signal generated by mixer 220. This sum signal is the transmit carrier signal which is modulated with the scrambled audio signal to provide the interfering transmit signal.

Figure 5:
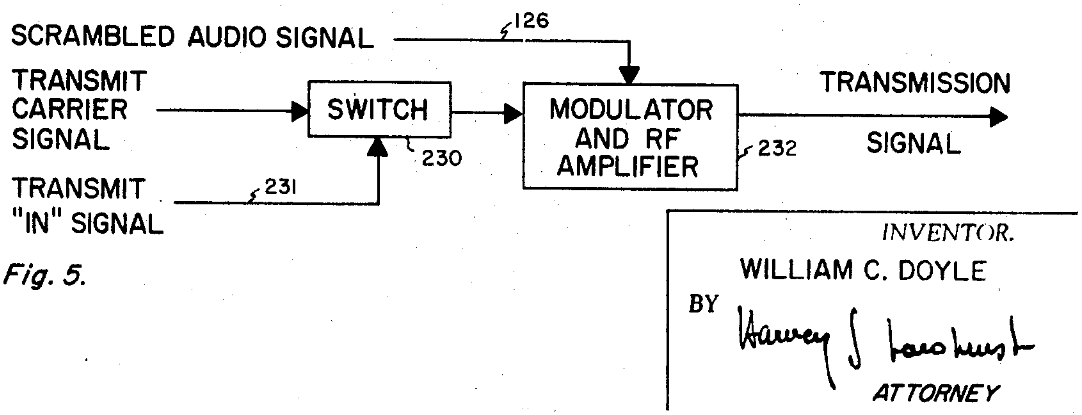
FIG. 5 is a schematic block diagram of the keyed transmit generator of FIG. 2.

The channel modulator, such as 130, may take the form shown in FIG. 5 and comprises a normally open transmit switch 230 which is closed upon application of the transmit "on" signal along lead 231 from timing and control circuit 108 (FIG. 2). The transmit carrier signal from transmit frequency generator 136 is applied to one side of switch 230 and the other side of the switch is connected to a modulator and RF amplifier circuit 232, which has also applied thereto the scrambled audio signal from delay combiner 121. Accordingly, whenever switch 230 is closed, circuit 232 develops a transmission signal in the form of the reconstructed carrier having modulated thereon the scrambled audio signal.

Referring now to the operation of the four channel radio communication interference system shown in FIG. 2, selector switch 116 is connected to a selected channel receiver and the selected receiver is tuned to a communication link to be interfered with. This process is repeated for the other channel receivers until all communication links to be interfered with have been discovered and a channel receiver is tuned thereto.

The operation of each individual channel of this multiple channel system is similar to the operation described in connection with the single channel system shown in FIG. 1. Briefly, during the receive portion of the duty cycle, the detected audio signal is recorded on a read-through recorder 120 for later analysis and is also applied to multiple delay combiner, such as 121, to derive a scrambled audio signal. During the transmit portion of the duty cycle, the scrambled audio signal is modulated upon the carrier signal reconstructed by transmit frequency generator 136 and is transmitted. Reception of the detected audio signal and transmission of the scrambled audio signal alternate in accordance with the frequency of the duty cycle signal developed by timing and control circuit 108.

There has been described an apparatus and a method for interfering with radio communications which allows read-through of the communication to be interfered with, while, at the same time, depriving an intended recipient of the intelligible communication. The method of interfering described herein requires less power than those employed heretofore and is more difficult to detect and to counteract than either jamming or deception techniques.

What is claimed is:

1. A radio communication interference system for destroying the intelligibility of a substantially continuous intelligence signal modulated upon a carrier signal, said system comprising:
   - means responsive to said carrier signal for demodulating said carrier signal and for deriving said intelligence signal exclusively during one portion of a duty cycle which is independent of said intelligence signal,
   - means responsive to said derived intelligence signal for continuously delaying said intelligence signal by different amounts of time to form a plurality of differently delayed by overlapping intelligence signals;
   - means responsive to said plurality of delayed and overlapping signals for summing said last mentioned signals to form a scrambled intelligence signal;
   - means for developing a further carrier signal which is of the same frequency as said carrier signal; and
   - means responsive to said further carrier signal and said scrambled intelligence signal for modulating said further carrier signal with said scrambled intelligence signal and for transmitting the so modulated further carrier signal exclusively during the other portion of said duty cycle.

2. A radio interference system in accordance with claim 1 which said means for continuously delaying said intelligence signals comprises a means for temporarily storing said intelligence signal upon a record member.

3. A radio interference system in accordance with claim 1 in which said means for continuously delaying said intelligence signal comprises: a movable magnetic tape; a recording head disposed in recording relationship to said tape and having said intelligence signal applied thereto; a plurality of reproduce heads spaced along said tape in reproducing relationship to said tape and down stream from said recording head, each of said reproduce heads providing one of said delayed intelligence signals and means for moving said tape.

4. A radio interference system in accordance with claim 1 in which said means for receiving said carrier signal comprises a receiving antenna; a tunable receiver; a switch means, operable by a switching signal for connecting said antenna to said receiver; and lock means for providing said switching signal during the said one portion of the duty cycle.

5. A radio interference system in accordance with claim 4 in which said means for modulating said further carrier signal comprises: a modulator; a further switch means connecting said means for developing said further carrier signal to said modulator, said further switch means being operable by said switching signal and being constructed to assume its closed position when said switch means assumes its open position, and an open position when said switch means assumes its closed position; and transmit antenna means connected to said modulator.

6. A radio interference system in accordance with claim 1 in which the two portions of said duty cycle are of substantially the same duration.

7. A radio communication interference system for destroying the intelligibility of an intelligence signal modulated upon a carrier signal, said system comprising:

receiver means responsive to said carrier signal and operative to demodulate said carrier signal to derive said intelligence signal;

first switching means associated with said receiver means for controlling deriving said intelligence signal, said switching means being normally in the closed position for deriving said intelligence signal and being responsive to a switching signal to open the same and to thereby discontinue deriving said intelligence signal; signal delay means responsive to said derived intelligence signal and operative to delay the same by a plurality of different times to provide a plurality of delayed but overlapping intelligence signals, summing means responsive to said delayed intelligence signals and operative to combine the same to form a scrambled intelligence signal;

transmitter means responsive to said scrambled intelligence signal and operative to modulate a further carrier signal, having the same frequency as said carrier signal, with said scrambled intelligence signal and to transmit said modulated further carrier signal;

second switching means associated with said transmitter means for controlling transmission, said second switching means being normally in the open position and being responsive to said switching signal to close the same and to thereby cause transmission of said modulated further carrier signal; and means for generating said switching signal connected to said first and said second switching means, said last mentioned means being independent of said modulated carrier signal.

8. A radio interference system in accordance with claim 7 in which said means for generating said switching signal has a duty cycle which is approximately equal to 50 percent.

9. A method for destroying the intelligibility of a substantially continuous intelligence signal transmitted by a radio communication system to an intended recipient, the method comprising the steps of:

receiving said intelligence signal during only one portion of a duty cycle;

delaying said received intelligence signal by various different amounts of time to form a number of timewise overlapping delayed signals;

combining the delayed signals to form a scrambled signal; and transmitting said scrambled signal only during the other portion of said duty cycle for reception by the intended recipient.